United States Patent [19]

Satoh et al.

[11] Patent Number: 5,780,168
[45] Date of Patent: Jul. 14, 1998

[54] POLYPROPYLENE COMPOSITION FOR LAMINATED AND ORIENTED FILM AND LAMINATED AND ORIENTED FILM THEREOF

[75] Inventors: Makoto Satoh; Ritsuo Setoh; Katsunari Inagaki; Jun Ohara, all of Chiba, Japan

[73] Assignee: Sumitomo Chemical Company, Limited, Osaka, Japan

[21] Appl. No.: 429,900

[22] Filed: Apr. 27, 1995

[30] Foreign Application Priority Data

Apr. 28, 1994 [JP] Japan ................. 6-092317

[51] Int. Cl.$^6$ ............... B32B 27/32; C08L 23/14
[52] U.S. Cl. ........................ 428/516; 525/240
[58] Field of Search ............... 525/240; 428/516

[56] References Cited

U.S. PATENT DOCUMENTS

| | | | |
|---|---|---|---|
| 4,186,240 | 1/1980 | Matsuda et al. | 428/349 |
| 4,302,504 | 11/1981 | Lansbury et al. | 428/332 |
| 4,652,489 | 3/1987 | Crass et al. | 428/337 |
| 4,725,505 | 2/1988 | Hwo et al. | 428/516 |
| 4,769,284 | 9/1988 | Kakugo et al. | 428/349 |
| 4,786,562 | 11/1988 | Kakugo et al. | 428/516 |
| 4,822,840 | 4/1989 | Kioka et al. | 525/240 |
| 4,894,421 | 1/1990 | Kioka et al. | 525/243 |
| 5,212,009 | 5/1993 | Peiffer et al. | 428/516 |

FOREIGN PATENT DOCUMENTS

| | | |
|---|---|---|
| 0203727 | 12/1986 | European Pat. Off. . |
| 0252718 | 1/1988 | European Pat. Off. . |
| 0263718 | 4/1988 | European Pat. Off. . |
| 0447953 | 9/1991 | European Pat. Off. . |
| 0560326 | 9/1993 | European Pat. Off. . |
| 0586160 | 3/1994 | European Pat. Off. . |
| 54-28351 | 3/1979 | Japan . |
| 54-60348 | 5/1979 | Japan . |
| 55-14223 | 1/1980 | Japan . |
| 55-46664 | 1/1980 | Japan . |
| 55-59964 | 5/1980 | Japan . |
| 56-58861 | 5/1981 | Japan . |
| 61-11844 | 6/1986 | Japan . |
| 61-248740 | 11/1986 | Japan . |
| 63-276541 | 11/1988 | Japan . |
| 64-18633 | 1/1989 | Japan . |

OTHER PUBLICATIONS

Dewent Publication No. 81-50418.

*Primary Examiner*—Donald R. Wilson
*Attorney, Agent, or Firm*—Sughrue, Mion, Zinn, Macpeak & Seas, PLLC

[57] ABSTRACT

A propylene-α-olefin random copolymer composition for use in a laminated and oriented film. The composition includes:

(A) from 75 to 95% by weight of a crystalline propylene random copolymer obtained by gas-phase polymerization of propylene and an α-olefin wherein the amount of components of the copolymer which are soluble in xylene at 20° C. is less than 15% by weight, the propylene content is from 73 to 97% by weight, the α-olefin content is from 3 to 27% by weight, and (B) from 5 to 25% by weight of a propylene random copolymer of propylene and α-olefin, wherein the propylene content is from 50 to 60% by weight, and the α-olefin content is from 35 to 65 % by weight, wherein the amounts of components in the propylene-α-olefin random copolymer composition which are soluble in xylene at 20° C. is less than 30% by weight.

2 Claims, No Drawings

POLYPROPYLENE COMPOSITION FOR LAMINATED AND ORIENTED FILM AND LAMINATED AND ORIENTED FILM THEREOF

FIELD OF THE INVENTION

The present invention relates to a polypropylene composition for use in a laminated and oriented film, and to a laminated and oriented film having a surface layer comprising the polypropylene composition. More specifically, the present invention relates to a polypropylene composition for use in a laminated and oriented film, the film having a good balance between low-temperature heat sealability and a hot tack property and exhibiting good processability as well as small deterioration of transparency of a substrate film when the polypropylene composition is laminated to the substrate film, and to a laminated and oriented film having a surface layer comprising the polypropylene composition.

BACKGROUND OF THE INVENTION

Propylene homopolymer, which has many desirable physical properties, has been applied to a wide variety of uses, such as packaging films. However, the heat sealing temperature of mono-layer films comprising propylene homopolymer is very high and their heat seal strength is insufficient because the melting temperature of propylene homopolymer is very high. On the other hand, propylene random copolymers produced by the random copolymerization of propylene with ethylene and/or another α-olefin having crystallinity and melting temperatures lower than those of propylene homopolymer, have good transparency and heat sealability. Thus, propylene random copolymers have been laminated to one or both surfaces of the substrate film comprising propylene homopolymer as heat-seal layers and the thus obtained laminated films have been used as the packaging films.

Slurry polymerization and bulk polymerization are known for production of propylene random copolymer. In those polymerization methods, copolymer components used to achieve low temperature heat sealability are dissolved and removed since the copolymerization or the post treatment of the copolymer is conducted in a solvent such as heptane, hexane, a mixed medium of propylene, an α-olefin and/or ethylene. Attempts to produce the propylene random copolymer with a higher content of a comonomer, such as an α-olefin and/or ethylene, in order to improve low-temperature heat sealability, causes the copolymer itself to be dissolved, which hinders the production of the copolymer. For those reasons, the improvement of the low-temperature heat sealability of the propylene random copolymers obtained by the above mentioned polymerization methods is largely restricted and the production of propylene random copolymers with improved heat sealability at low temperature has substantially not been attained by an industrially useful method.

Attempts have been made to improve low-temperature heat sealability by using a composition of the crystalline propylene random copolymers and propylene-butene-1 copolymers or polybutene.

For example, in JP-A-55-14223 (the term "A" as described herein means an "unexamined published Japanese patent application"), a multi-layered film having a heat seal layer comprising the composition of propylene-butene-1 copolymers and propylene-ethylene copolymers is disclosed. The propylene-butene-1 copolymer, which was applied to improving low-temperature heat sealability of the heat seal layer, has high melting temperature due to low butene-1 content, and the heat seal layer produced from the composition result in narrow heat sealable temperature range and insufficient low-temperature heat sealability. Also, because of the broad molecular weight distribution of the propylene-butene-1 copolymers produced by the catalyst titanium trichloride, a large amount of low-molecular weight polymer component is produced which has an undesirable influence on blocking resistance and whitening by bleeding of film and the multi-layered film produced from the compositions are undesirable for packaging film.

In JP-A-63-276541, a composition comprising crystalline propylene-ethylene random copolymers and propylene-butene-1 copolymers produced by gas-phase polymerization is disclosed. Although the low-temperature heat sealability of the laminated film produced from this composition is superior, the amount of components of propylene-butene-1 copolymer soluble in xylene at 20° C. is more than 15% by weight, and the high content of some increases the deposition of adhesive matter on rolls used for longitudinal stretching of the film which results in the deterioration of film processability when the production of the laminated film is carried out for a long time. Moreover, the laminated film obtained from this composition has poor blocking resistance and whitening by bleeding and packaging film produced therefrom is inferior. When film is formed with a large-scale film-forming machine, the above defects become especially notable.

JP-A-61-248740, JP-A-56-58861 and JP-A-64-18633 disclose multi-layered films with improved low-temperature heat sealability obtained using the compositions comprising crystalline propylene-ethylene random copolymers or crystalline propylene-ethylene-butene-1 copolymers and low crystalline propylene-butene-1 copolymers. However, the comonomer contents of these crystalline copolymers, as the main component in these compositions, are low because these crystalline copolymers are produced by a slurry polymerization method or bulk polymerization method, and the hot tack property of the obtained multi-layered films is insufficient.

In JP-A-54-60348, JP-A-54-28351, JP-B-55-46664 (the term "B" as described herein means an "examined published Japanese patent application"), compositions are disclosed which comprise the crystalline propylene random copolymers and polybutene. However, the melting temperature of polybutene is as high as 110° C. and thus the low-temperature heat sealability of the multi-layered film produced from these compositions is poor.

In JP-A-55-59964 and JP-A-61-118449, compositions are disclosed comprising the crystalline propylene random copolymers and the propylene-butene-1 copolymers, of which the amount of butene-1 is more than 70% by weight.

Although the melting temperature of the propylene-butene-1 copolymers is low enough to improve low-temperature heat sealability of the films produced from the described compositions, the crystallization rate of the above propylene-butene-1 copolymers is much slower than that of polypropylene so that the hot tack property of the films is inferior. Thus, the films produced from these compositions are still inadequate in the balance between low-temperature heat sealability and hot tack.

Specifically, a composition comprising propylene-butene-1 copolymer with a high butene-1 content is effective to improve low-temperature heat sealability of film thereof, and a composition comprising crystalline propylene random copolymer with a high comonomer content is effective to improve its hot tack property. On the contrary, the amount of components soluble in xylene at 20° C. contained in the composition, which comprises both the propylene-butene-1 copolymer and the crystalline propylene random copolymer, increases with increasing amounts of comonomer or butene-1, and the film produced from those compositions containing the large amount of components soluble in xylene at 20° C. is undesirable for use as packaging film. The large amount components soluble in xylene at 20° C. also increases the deposition of adhesive matter on rolls used for longitudinal stretching which results in deterioration of film processability when the production of the film is carried out for a long time. Additionally, the film obtained from such a composition is disadvantageous in terms of blocking resistance and whitening by bleeding.

SUMMARY OF THE INVENTION

Accordingly, an object of the present invention is to provide a polypropylene composition with which laminated and oriented film can be prepared, the film having excellent balance between low-temperature heat sealability and hot tack producing a small deposition of adhesive matter on rolls used for longitudinal stretching during film formation for a relatively long time and not deteriorating the transparency of a substrate film of polypropylene, the laminated and oriented film having a surface layer comprising the polypropylene composition.

As a result of various investigations to develop such a composition of propylene random copolymers, the inventors have found that the above object can be attained with a composition comprising a crystalline propylene random copolymer which is obtained by gas-phase polymerization, wherein the content of components which all soluble in xylene at 20° C. and the α-olefin content are within certain ranges, and propylene-α-olefin random copolymer wherein the α-olefin content is in a certain range, the composition containing a certain range content of components which are soluble in xylene at 20° C.

That is, the present invention relates to a polypropylene composition for a laminated and oriented film, the composition comprising:

(A) from 75 to 95% by weight of a crystalline propylene random copolymer obtained by gas-phase polymerization of propylene with α-olefin, and optionally together with ethylene, wherein the content in the copolymer of components which are soluble in xylene at 20° C. is less than 15% by weight, the propylene content is from 73 to 97% by weight based upon the total weight of the copolymer, the ethylene content is from 0 to 6% by weight, and the α-olefin content is from 3 to 27% by weight, and (B) from 5 to 25% by weight of a propylene random copolymer of α-olefin, wherein the propylene content is from 35 to 65% by weight, and the α-olefin content is from 35 to 65% by weight, the content components of the composition which are soluble in xylene at 20° C. being less than 30% by weight.

The present invention also relates to the above-mentioned composition for use as a laminated and oriented film wherein the propylene-α-olefin random copolymer (B) is obtained by the copolymerization of propylene and α-olefin in with a solid catalyst component containing Ti, Mg, a halogen and an electron donor as essential constituents in the presence of solvent.

The present invention further relates to a laminated and oriented film having a surface layer of the above-mentioned composition.

According to the present invention, it has become possible to obtain a laminated and oriented film having excellent long time workability in the film formation, excellent low-temperature heat sealability and excellent hot tack property by laminating on one or both surfaces of substrate film with the composition comprising the crystalline propylene random copolymer, which contains more than 3% by weight of α-olefin in to reveal the high hot tack strength, and less than 15% by weight of 20° C. xylene-soluble components, and the propylene-α-olefin random copolymer, which is narrow molecular weight distribution with a small amount of low-molecular weight polymer component and narrow composition distribution, and which contains more than 35% by weight of α-olefin to improve the low-temperature heat sealability.

DETAILED DESCRIPTION OF THE INVENTION

The present invention is described in detail below.

The crystalline propylene-α-olefin random copolymer (A) used in the polypropylene composition of the present invention is a propylene random copolymer that can be obtained by gas-phase polymerization of propylene and α-olefin optionally together with ethylene. In the crystalline propylene-α-olefin random copolymer (A), the amount of components which are soluble in xylene at 20° C. is less than 15% by weight, the propylene content is from 73 to 97% by weight of the total weight of the copolymer, the ethylene content is from 0 to 6% by weight and, the α-olefin content is from 3 to 27% by weight.

In the crystalline propylene random copolymer (A) of the present invention, the propylene content is from 73 to 97% by weight, preferably from 75 to 95% by weight and more preferably from 75 to 90% by weight, the ethylene content is from 0 to 6% by weight, preferably from 0.5 to 5% by weight, and the α-olefin content is from 3 to 27% by weight, preferably from 5 to 25% by weight and more preferably from 10 to 25% by weight.

If the propylene content in the crystalline propylene random copolymer (A) is less than 73% by weight, the melting temperature of the crystalline propylene random copolymer is so low that processability of the film produced from the the composition deteriorates, while if the content is over 97% by weight, the low-temperature heat sealability of the film is insufficient due to the relatively high melting temperature of the crystalline propylene random copolymer.

Although the ethylene component is not essential, it is preferred that the ethylene content be from 0.5 to 5% by weight from a standpoint of film processability for long period of running and hot tack strength. It is preferred that the α-olefin content be from 3 to 27% by weight. If the α-olefin in content is less than 3% by weight, the film melting temperature is high and the hot tack strength of the film is insufficient. If the α-olefin content is over 27% by weight, the processability of the film produced from the composition deteriorates.

It is important in the present invention that the amount of components in the crystalline propylene random copolymer (A) which are soluble in xylene at 20° C. is less than 15% by weight. If the amount of these components is over 15% by weight, low-molecular weight polymer components adhere to rolls used for longitudinal stretching during film-formation for long periods of running and the film processability deteriorates.

Any suitable α-olefin may be used as the α-olefin for the crystalline propylene random copolymer of the present invention. Preferably, an α-olefin having from 4 to 10 carbon atoms, for example, butene-1, pentene-1, hexene-1, heptene-1, octene-1 and 3-methylbutene-1, can be used, and butene-1 is preferably used. Other suitable α-olefins will be apparent to one skilled in the art.

The crystalline propylene random copolymer (A) of the present invention is obtained by gas-phase polymerization of propylene and α-olefin optionally together with ethylene. The gas-phase polymerization is conducted substantially in the absence of solvent, and is different from the slurry polymerization and bulk polymerization.

The gas phase polymerization may be conducted with a conventional fluid bed reactor, a fluid bed reactor equipped with a stirrer, and like. It is essential to carry out the polymerization under such temperature/pressure conditions that prevent the liquefaction of monomer gases and agglomeration of polymer particles in the reactor. The polymerization conditions are generally: a temperature range of 20°–150° C., preferably 50°–95° C., and a pressure range of 1–50 kg/cm². A molecular weight controlling agent, such as hydrogen, is preferably added for the purpose of controlling the melt flowability of the polymer obtained. The gas phase polymerization may be conducted by any of batch polymerization, continuous polymerization, and the combination of the two. The monomers and molecular weight controlling agent consumed in the course of the polymerization may be fed to the reactor either continuously or intermittently. The crystalline propylene random copolymer of the present invention may be washed after the gas phase polymerization with an alcohol, hydrocarbon solvent, or the like to remove the catalyst residue or to remove low molecular weight polymer.

The catalyst used for the production of the crystalline propylene random copolymer (A) of the present invention may be the stereospecific polymerization catalyst for α-olefin known to the art to provide mainly isotactic poly-α-olefin. An example of such a catalyst is the conventional so-called "Ziegler-Natta" catalyst, that is, a catalyst comprising a transition metal compound of IV–VII in the periodic table and organometal compound of I–III metal in the periodic table. The such a catalyst, for example:

(a) the transition metal compound may be (I) a solid complex consisting of trivalent titanium halide as a main component, or (II) a solid complex comprising titanium, magnesium, a halogen and an electron donor as essential components, and (b) organometal compound may be an organoaluminum compounds.

A soluble catalyst, such as the so-called "metallocene catalysts" can also be used.

Solid complex (I) consisting of trivalent titanium halide as a main component is generally obtained in the form of a TiCl₃ composition by the reduction of TiCl₄ with hydrogen, metallic aluminum, metallic titanium, an organoaluminum compound or organomagmesium compound. More preferably, the solid complex is a trivalent titanium halide obtained by the reduction of Ti(OR)$_b$X$_{4-b}$ (wherein R represents a hydrocarbon group having from 1 to 20 carbon atoms, X represents a halogen atom, and b is a number $0 \leq b \leq 4$) with an organoaluminum compound followed by treatment with an ether compound and TiCl₄.

The hydrocarbon group R may be, for example, an alkyl group, such as methyl, ethyl, iso-propyl, butyl, iso-butyl, amyl, iso-amyl, hexyl, heptyl, octyl, decyl, dodecyl, etc.; an aryl group, such as phenyl, cresyl, xylyl, naphthyl, etc.; a cycloalkyl group, such as cyclohexyl, cyclopentyl, etc.; an allyl group, such as propenyl, etc.; and an aralkyl group, such as benzyl, etc.

Solid complex (II) comprising titanium, magnesium, a halogen and an electron donor, as essential components, may be generally obtained by treating with an ester compound a solid product obtained by reducing a titanium compound with an organomagnesium compound, and then further treating the treated product with titanium tetrachloride.

The titanium compound used to produce the solid complex (II) may be represented by the formula Ti(OR')$_c$X$_{4-c}$ wherein R' represents a hydrocarbon group having from 1 to 20 carbon atoms, X represents a halogen atom, and c is a number of $0 < c \leq 4$.

The hydrocarbon group R' may be, for example, an alkyl group, such as methyl, ethyl, iso-propyl, butyl, iso-butyl, amyl, iso-amyl, hexyl, heptyl, octyl, decyl, dodecyl, etc.; an aryl group, such as phenyl, cresyl, xylyl, naphthyl, etc.; a cycloalkyl group, such as cyclohexyl, cyclopentyl, etc.; an allyl group, such as propenyl, etc.; and an aralkyl group, such as benzyl, etc.

Any suitable organomagnesium compound having a magnesium-carbon bond can be used as the magnesium component. Preferably, the organomagnesium compound is a Grignard compound represented by the formula R"MgX wherein R" represents a hydrocarbon group having from 1 to 20 carbon atoms and X represents a halogen atom, or a magnesium compound represented by the formula R₁R₂Mg wherein R₁ and R₂, which may be the same or different, each represents a hydrocarbon group having from 1 to 20 carbon atoms. Other suitable organomagnesium compounds will be apparent to one skilled in the art.

Examples of the Grignard compound include methylmagnesium chloride, ethylmagnesium chloride, ethylmagnesium bromide, ethylmagnesium iodide, propylmagnesium chloride, propylmagnesium bromide, butylmagnesium chloride, butylmagnesium bromide, sec-butylmagnesium chloride, sec-butylmagnesium bromide, tert-butylmagnesium chloride, tert-butylmagnesium bromide, amylmagnesium chloride, iso-amylmagnesium chloride, phenylmagnesium chloride, phenylmagnesium bromide, etc. Also, examples of the magnesium compound represented by R₁R₂Mg include diethylmagnesium, dipropylmagnesium, diiso-propylmagnesium, dibutylmagnesium, di-sec-butylmagnesium, di-tert-butyl-magnesium, butyl-sec-butylmagnesium, diamylmagnesium, diphenylmagnesium, etc. Other suitable magnesium compounds will be apparent to one skilled in the art.

The electron donor may be, for example, mono- or polycarboxylic acid ester, and aliphatic carboxylic acid ester, olefinic carboxylic acid ester, alicyclic carboxylic acid ester or aromatic carboxylic acid ester. Examples of the electron donative compounds are methyl acetate, ethyl acetate, phenyl acetate, methyl propionate, ethyl propionate, ethyl butyrate, ethyl valerate, methyl acrylate, ethyl acrylate, methyl methacrylate, ethyl benzoate, butyl benzoate, methyl toluate, ethyl toluate, ethyl anisate, diethyl succinate, dibutyl succinate, dimethyl malonate, diethyl malonate, dibutyl malonate, diethyl itaconate, dibutyl itaconate, monoethyl phthalate, dimethyl phthalate, methyl ethyl phthalate, diethyl phthalate, di-n-propyl phthalate, di-iso-propyl phthalate, di-n-butyl phthalate, di-iso-butyl phthalate, di-n-heptyl phthalate, di-n-octyl phthalate, diphenyl phthalate, etc. and these ester compounds are preferably used.

The organoaluminum compound (b) which should be used in combination with the transition metal compound (a) has at least one Al-carbon bond in the molecule.

Examples of the organoaluminum compound include a trialkylaluminum, such as triethylaluminum, triisobutylaluminum, trihexylaluminum, etc.; a dialkylaluminum halide, such as diethylaluminum halide, diisobutylaluminum halide, etc.; a mixture of the trialkylaluminum and the dialkylaluminum halide; and an alkylalmoxane, such as tetraethyldialmoxane, tetrabutyldialmoxan, etc. Other suitable organoaluminum compounds will be apparent to one skilled in the art.

Among those organoaluminum compounds, the trialkylaluminum, a mixture of the trialkylaluminum and the dialkylaluminum halide, and the alkylalmoxane are preferred, and triethylaluminum, triisobutylaluminum, a mixture of triethylaluminum and diethylaluminum chloride, and tetraethyldialmoxane are more preferred.

To reduce the amount of the copmonents of the crystalline propylene random copolymer (A) which are soluble in xylene at 20° C. to less than 15% by weight, electron donative compounds (c) should coexist with the catalyst component (a) and (b) during polymerization.

The electron donative compounds (c) which preferably coexist with the solid complex (I) include esters and anhydrides, such as ethyl acetate, ε-caprolacton, methyl methacrylate, ethyl benzoate, p-ethyl anisate, p-methyl toluate, phthalic anhydride and the like; ethers, such as di-n-butyl ether, diphenyl ether, diglime and the like; and organophosphorus compounds, such as tri-n-butyl phosphite, triphenyl phosphite hexamethylenephosphoric triamide and the like. Also usable as the electron donative compounds are ketones, amines, amides, thioethers, alkoxysilanes having Si—O—C linkage, organosilicone compounds, such as aryloxysilane. Among these compounds, ε-caprolacton is prefered because to reduce the amount of components of the crystalline propylene random copolymer (A) which are soluble in xylene at 20° C. xylene-soluble to less than 15% by weight.

The electron donative compounds (c) which preferably coexist with the solid complex (II) is the silicon compound (C').

The silicon compound (C') represented by the formula $R^1R^2Si(OR^3)_2$, which is preferably used, is a silicon compound wherein $R^1$ represents as a hydrocarbon group having from 1 to 20 carbon atoms or alicyclic hydrocarbon group having from 5 to 20 carbon atoms and $R^2$ and $R^3$ each represents a hydrocarbon group having from 1 to 20 carbon atoms.

The examples of the alkoxysilane compound are tetramethoxysilane, methyltrimethoxysilane, dicyclohexyl-, diisobutyl-, dioctadecyl- or dimethyldimethoxysilane, cyclohexyl-, isobutyl-, octadecyl- or ethyldimethoxysilane, phenyltrimethoxysilane, phenylmethyldimethoxysilane, tetraethoxysilane, methyltriethoxysilane, ethyltriethoxysilane, vinyltriethoxysilane, phenyltriethoxysilane, diphenyldimethoxysilane, diphenyldiethoxysilane, butyltriethoxysilane, tetrabutoxysilane, vinyltributhoxysilane, diethyldiethoxysolane, etc. Among these silicon compounds exemplified above, cyclohexylethyldimethoxysilane is preferable for reducing the content of 20° C. xylene-soluble components of the crystalline propylene random copolymer (A) to be less than 15% by weight.

Preferably, a catalyst is used such that the molar ratio of the Al atom in component (b)/the Ti atom in component (a) is from 1:1 to 1000:1, and preferably from 5:1 to 600:1, and the molar ratio of the component (c)/the Al atom in the component (b) becomes from 0.02:1 to 500:1, and preferably from 0.05:1 to 10:1.

The other component of the propylene-α-olefin random copolymer composition of the present invention is propylene random copolymer obtained by copolymerizing propylene with α-olefin, wherein the propylene content is from 35 to 65% by weight and the α-olefin content is from 35 to 65% by weight.

In the propylene random copolymer (B) of the present invention, the propylene content is from 35 to 65% by weight, preferably from 40 to 60% by weight, more preferably from 40 to 50% by weight, and the α-olefin content is from 35 to 65% by weight, preferably from 40 to 60% by weight and more preferably from 50 to 60% by weight.

If the propylene content in the propylene-α-olefin random copolymer (B) is less than 35% by weight, hot tack strength is insufficient, and if the content of the same is over 65% by weight, the low-temperature heat sealability is insufficient.

The molecular weight distribution (Mw/Mn) of the propylene-α-olefin in random copolymer (B) measured using GPC is preferably less than 4.0. This is because if the molecular weight distribution of the random copolymer is more than 4.0, processability of the film produced from the propylene composition of the present invention deteriorates. To achieve a narrow molecular weight distribution and narrow composition distribution of the propylene-α-olefin random copolymer (B) of the present invention, a catalyst consisting of at least titanium, magnesium, a halogen atom and an electron donor as essential components is preferred.

Such a catalyst component preferably comprises;

(a) a solid complex (II) comprising titanium, magnesium, a halogen atom and an electron donor, as the essential components, (b) an organometallic compound, and (c') a silicon compound as an electron donor.

Above (a), (b) and (c') are similar to thoses described in the production of the crystalline propylene random copolymer (A).

As the α-olefin for the propylene-α-olefin random copolymer (B) of the present invention, the same types of α-olefin as the ones for the crystalline propylene random copolymer (A) can be used. That is, an α-olefin having from 4 to 10 carbon atoms, for example, butene-1, pentene-1, hexene-1, heptene-1, octene-1 and 3-methylbutene-1, can be used, and butene-1 is preferably used. Other suitable α-olefin will be apparent to one skilled in the art.

The propylene-α-olefin random copolymer (B) of the present invention may also contain a small amount of ethylene unless the effects of the present invention are reduced.

The propylene-α-olefin random copolymer (B) may be produced either in a liquid-phase or a gas-phase, and in particular, is produced preferably under conditions such that the random copolymer is completely dissolved in the liquid-phase, that is, a so-called solution polymerization method in the presence of a solvent is preferred. In the case liquid-phase, production, the polymerization can be practiced in an inactive solvent. Examples of inactive solvent include aliphatic hydrocarbon compounds, such as hexane, heptane, paraffine oil, etc.; alicyclic hydrocarbon, compound such as cyclohexane, etc.; and aromatic hydrocarbon compound, such as benzene, toluene, etc. The polymerization may be carried out in the reaction media of the monomer itself, that is a so-called bulk polymerization method. Of these polymerization methods, the polymerization in the presence of the solvent is the most preferable.

The propylene-α-olefin copolymer (B) of the present invention is produced under polymerization conditions similar to the usual olefin polymerization conditions with the Ziegler-Natta type catalyst. The copolymerization temperature range is usually of 30°–140° C., preferably 30°–120° C. and the copolymerization is preferably carried out under the pressure at a pressure range usually of atmospheric pressure to 50 kg/cm$^2$.

Although the molecular weight of the propylene-α-olefin copolymer (B) can be controlled to some extent by altering the polymerization conditions, such as polymerization temperature or the ratio of the amounts of the catalyst components, the addition of hydrogen to the polymerization system is the most effective technique controlling the molecular weight.

As to the ratio of the crystalline propylene random copolymer (A) and the propylene-α-olefin random copolymer (B), in the polypropylene composition of the present invention, the amount of the crystalline propylene random copolymer (A) is from 75 to 95% by weight, preferably from 80 to 90% by weight, and that of the propylene-α-olefin random copolymer (B) is from 5 to 25% by weight, preferably from 10 to 20% by weight as mentioned above. In the composition, the amount of components which are soluble in xylene at 20° C. is less than 30% by weight, preferably less than 28% by weight. If the composition is outside of the above-mentioned ranges, the production of laminated and oriented film having excellent film processability and excellent low-temperature heat sealability and hot tack, which is the object of the present invention, cannot be attained. The amount of these components in the resulting composition can be estimated by the additivity of the content of 20° C. xylene-soluble components of the crystalline propylene random copolymer (A) and that of the propylene-α-olefin random copolymer (B). Thus, the ratio of the crystalline propylene random copolymer (A) and the propylene-α-olefin random copolymer (B) is determined such that the amount of compnents which are soluble in xylene at 20° C. is less than 30% by weight.

The polypropylene composition of the present invention has a melt flow rate of from 1 to 50 g/10 min, preferably from 2 to 30 g/10 min, and more preferably from 3 to 20 g/10 min, in order to achieve transparency and the high-speed workability in the production of the film. To obtain a polypropylene composition having the melt flow rate within the above range and ratio of the crystalline propylene random copolymer (A) to the propylene-α-olefin random copolymer (B) determined aforesaid, it is necessary to control each melt flow rate of the crystalline propylene random copolymer (A) and the propylene-α-olefin random copolymer (B). The intrinsic viscosity of the propylene-α-olefin random copolymer (B) is from 1 to 2 and its melt flow rate is from 4 to 8 to achieve superior low-temperature heat sealability of the film produced from the propylene composition. The melt flow rate may be controlled by regulating the concentration of hydrogen during the polymerization or by decomposing the produced polymer with a peroxide. Thus, the polypropylene composition of the present invention can be obtained by mixing the crystalline propylene random copolymer (A) and the propylene-α-olefin in random copolymer (B) of this invention, under conditions which control their melt flow rates by the above mentioned methods, with a method known to the art such as melt mixing.

The polypropylene composition of the present invention can be, if necessary, compounded with an antioxidant, a neutralizing agent, a lubricant, an antiblocking agent, an antistatic agent, etc., which are ordinary used in the art, unless the effects of the present invention are reduced.

The laminated and oriented film of the present invention is described as follows.

The laminated and oriented film of the present invention can be obtained by laminating the aforesaid polypropylene composition on one or the both surfaces of a substrate film by conventional methods. Any suitable substrate film may be used. Preferably, the substrate film is crystalline α-olefin polymer, more preferably crystalline polypropylene is used. The crystalline polypropylene preferably has an intrinsic viscosity ($[\eta]$) of from 1.3 to 4.2 dl/g, wherein the amount of component which are insoluble in boiling heptane is more than 80% by weight and the amount of propylene is more than 95% by weight and stereospecificity is mainly isotactic. Further, the crystalline polypropylene may be a copolymer of propylene and ethylene and/or butene-1, wherein comonomers content is less than 5%.

Laminated and oriented film having a surface layer comprising the polypropylene composition of the present invention can be obtained without deteriorating the transparency of the substrate which is the preferred characteristic the polypropylene substrate film inherently possesses, resulting laminated and oriented film has excellent balance of the low-temperature heat sealability and the hot tack.

The laminated and oriented film of the present invention can be obtained by, for example:

- adhering a previously formed sheet of a substrate layer and a previously formed sheet of the polypropylene composition by passing them between pressure rollers;
- coating the polypropylene composition in the form of a solution or dispersion in a solvent, such as toluene, etc., on the substrate layer to effect lamination;
- melt-extruding coating the polypropylene composition on a substrate layer to effect lamination;
- or extruding the polypropylene composition and the substrate polymer layer through separate extruders and then bonding them in or at the outlet of a common die while the polypropylene composition and the substrate material are still in a molten state.

The laminated film of the present invention, which can be used without being stretched, is preferably uniaxially or biaxially stretched after the aforesaid polypropylene composition has been laminated thereto as the heat-seal layer to the substrate layer. Such laminated and oriented film may be produced by conventional methods. Such conventional methods include:

1. preparing an unstretched laminated sheet by coextrusion of both the polypropylene composition of this invention and the substrate polymer layer in an extruding die at or near outlet of the extruding die to form the laminated sheet while the two are still in a molten state, and then biaxially stretching the laminated sheet,
2. extrusion-laminating the above-mentioned polypropylene composition on a substrate sheet, and then biaxially stretching the laminated sheet, and
3. previously uniaxially stretching a substrate sheet in the machine direction (MD) in a heated state through a group of rolls including a metallic roll, extrusion-laminating the above described polypropylene composition on the uniaxially stretched sheet, and stretching the extrusion-laminated sheet in a traversal direction to the MD. Among these methods, the third method is preferred.

The laminated film of the present invention has excellent in the low-temperature heat sealability and its hot tack strength is high in a wide range of heat sealing temperatures. That is, in accordance with the present invention, there is obtained a laminated film which has more than 260 g of the hot tack strength of 75 mm in width of the film at heat sealing temperature range wider than 40° C.

The laminated and oriented film produced by the above mentioned methods has excellent balance between the low-temperature heat sealability and hot tack and can be obtained with a relatively small deposition of adhesive matter on rolls used during film formation and without deterioration of transparency of the substrate film which is the perferred characteristic of the substrate film possesses. Thus, the film is of great practical value.

The present invention is described in more detail below with reference to Examples, which, however, in no way limit the present invention. The value of the respective items described in the DETAILED DESCRIPTION OF THE INVENTION and Examples were determined in the following manner.

(1) butene-1 content (% by weight):

This was determined by the $^{13}$C-nuclear magnetic resonance spectrometry method described in *Koobunshi Bunseki (Polymer Molecule Analysis) Handbook*, page 258 "(i) Random Copolymer", published by Asakura Shoten, 1985.

(2) ethylene content (% by weight):

This is determined by the IR spectral method described in *Koobunshi Bunseki (Polymer Molecule Analysis) Handbook*, page 256 "(i)Random Copolymer", published by Asakura Shoten, 1985.

(3) Melt flow rate (MFR) (g/10 min):

Measured by the method of condition-14 (230° C., 2.16 kgf) according to JIS K7210.

(4) Transparency (haze) (%):

Measured according to JIS K7105.

(5) Low-temperature heat sealability (Heat sealing temperature) (°C.):

Sealed film obtained by pressing superposed heat-seal layers of film by means of a heat sealer (mfd. by Toyo Seiki Seisaku-syo Ltd.) and heated to a predetermined temperature for 2 seconds by applying a load of 2 kg/cm$^2$ were allowed to stand overnight and thereafter the films were peeled off each other at 23° C., at a peeling speed of 200 mm/minute, and at a peeling angle of 180°. In this case, the temperature of the heat sealer when the peeling resistance became 300 g/25 mm was employed as the heat sealing temperature.

(6) Hot tack strength (g/75 mm):

The laminated film was cut into samples 75 mm in width and 100 mm in length. A one side of the sample was adhered to one of an outer edge of a plate load spring. Then, the plate load spring was bent by hand into a U-shape, and the other side of the sample was adhered to the other outer edge of the bent plate load spring so that the heat-seal layer of the sample faced to the inside. Then, the sample was heat-sealed by pressing with a heat sealer (mfd. by Tester Sangyo Co., Ltd.) and heated to a predetermined temperature under a load of 2 kg/cm$^2$ for 2 seconds. Then, a peeling force was applied to the heat sealed part of the sample by releasing the hand which was holding the load spring immediately before raising a heat seal bar. After removing the sample from the load spring, a length of a peeled part was measured. Hot tack strength was determined as the peeling strength at which the peeled length of the sealed part was ⅛ inch (3.2 mm), with variation of the spring load.

(7) component which are soluble in xylene at 20° C. (CXS) (% by weight):

After completely dissolving 1 g of a sample in 100 ml of boiling xylene, the temperature of the solution was lowered to 20° C. and the solution was allowed to stand for 4 hours. Thereafter, precipitates formed were filtered away and the filtrate obtained was evaporated in dryness and dried at 70° C. under reduced pressure. The weight of the residue was measured to determined the content as weight %.

(8) Weight average molecular weight/number average molecular weight (Mw/Mn):

This was determined by gel permeation chromatography (GPC) under the following conditions. The calibration curve was prepared by using standard polystyrenes.

Apparatus; Type 150 CV, mfd. by Millipore Waters Co., Ltd.

column; Shodex M/S 80

Measuring temperature; 145° C.

Solvent; o-dichlorobenzene

Sample concentration; 5 mg/8 ml

When determination was made under the above conditions with Standard Reference Material 706 (a polystyrene having Mw/Mn of 2.1) of NBS (National Bureau of Standards), a value of molecular weight distribution (Mw/Mn) of 2.1 was obtained.

(9) Film processability

The obtained film, which easily peeled off from rolls for longitudinal stretching without staining the rolls observed with eyes after 10 minutes from starting of film formation, is classified as ○. The obtained film, which easily peeled off from the rolls without staining the rolls so much observed with eyes after 10 minutes from starting of film formation, is classified as Δ. The obtained film, which hardly peeled off from the rolls with staining markedly the rolls observed with eyes after 10 minutes from starting of film formation, is classified as X.

(10) Intrinsic viscosity ($|\eta|$) (g/dl):

Reduced viscosities were measured with an Ubbelohden type viscometer in tetraline at 135° C. on diluted samples having a concentration of 0.1, 0.2 or 0.5 g/dl. The intrinsic viscosity was calculated from the reduced viscosities measured above by the calculation method described in *Koobunshi Youeki, Koobunshi Zikkengaku* 11, page 491, published by Kyouritu Shuppan Co. Ltd., 1981.

REFERENCE EXAMPLE 1

(a) Synthesis of organomagnesium compound

A 1-l flask equipped with a stirrer, reflux condenser, dropping funnel and thermometer was flushed with argon. Therein was placed 32.0 g of magnesium turnings for use as a Grignard reagent. Then 120 g of butyl chloride and 500 ml of dibutyl ether were placed in the dropping funnel. About 30 ml of the resulting mixture was added dropwise to magnesium in the flask to initiate a reaction. After initiation of the reaction, the dropwise addition was continued at 5° C. over the course of 4 hours. After completion of the addition, the reaction was further continued at 60° C. for 1 hour. Thereafter, the reaction mixture was cooled to room temperature. The obtained solid was then separated by filtration.

The concentration of butylmagnesium chloride in dibutyl ether was determined by hydrolyzing the chloride with 1-N sulfuric acid, followed by back titration with 1-N aqueous sodium hydroxide solution using phenolphthalein as an indicator. The concentration was found to be 2.1 mol/l (b) Synthesis of solid product A 500-ml flask equipped with a stirrer and dropping funnel was flushed with argon. Then 240 ml of hexane, 5.4 g (15.8 mmoles) of tetrabutoxytitanium and 61.4 g (295 mmoles) of tetraethoxysilane were placed therein to form a uniform solution. Then, 150 ml of organomagnesium compound synthesized in (a) was gradually added by drops from the dropping funnel over the course of 4 hours while keeping the temperature in the flask at 5° C. After completion of the dropwise addition, the reaction mixture was stirred at room temperature for an additional 1 hour. The obtained solid was separated from the liquid, washed repeatedly 3 times with 240 ml of hexane and then dried under reduced pressure to obtain 45.0 g of a brown solid product.

The solid product was found to contain 1.7% by weight of titanium atoms, 33.8% by weight of ethoxy groups and 2.9% by weight of butoxy groups.

The solid product showed utterly no obvious diffraction peak in the wide angle X-ray diffraction pattern obtained by using Cu—Kα line. This fact demonstrate that the solid product was of an amorphous structure.

(c) Synthesis of ester-treated solid

A 100-ml flask was flushed with argon. Then 6.5 g of the solid product obtained in (b), 16.2 ml of toluene and 4.3 ml (16 mmoles) of diisobutyl phthalate were placed therein. The resulting mixture was allowed to react at 95° C. for 1 hour. After reaction, the reaction mixture was separated into solid and liquid products. The solid product was washed with toluene.

(d) Synthesis of solid catalyst (activation treatment)

After completion of washing in above (c), 16.2 ml of toluene, 0.36 ml (1.3 mmoles) of diisobutyl phthalate, 2.2 ml (13 mmoles) of butyl ether and 38.0 ml (346 mmoles) of titanium tetrachloride were added into the flask. The resulting mixture was allowed to react at 95° C. for 3 hours. After completion of the reaction, the obtained solid was separated from the liquid and washed twice with 33 ml of toluene at the same temperature. The above-mentioned treatment with a mixture of diisobutyl phthalate, butyl ether and titanium tetrachloride was repeated once more under the same conditions. The thus treated solid was washed 3 times with 33 ml of hexane to obtain 5.0 g of an ocherous solid catalyst. The solid catalyst contained 2.0% by weight of titanium atom and 15.6% by weight of phthalic ester.

(e) Preparation of propylene prepolymerization catalyst

In a 500-ml reactor equipped with a stirrer, was placed 100 ml of thoroughly purified hexane. The atmosphere in the system was thoroughly replaced with nitrogen. Thereafter 1.24 mmoles of triethylalminium (hereinafter abbreviated as TEA), 0.124 mmoles of cyclohexylethyldimethoxysilane (hereinafter abbreviated as CHEDMS) and 0.01 g in terms of Ti atom of the solid catalyst obtained in (d) described above were added into the flask. With the temperature in the flask maintained at 20° C. or below, propylene was continuously fed into the flask while regulating the amount of absorbed propylene to obtain polypropylene/solid catalyst of prepolymerization catalyst=2.4 (weight ratio).

(f) Production of propylene-α-olefin random copolymer (B)

Propylene-α-olefin random copolymer was produced with the propylene prepolymerization catalyst obtained in the (e) by above a continuous polymerization process.

A polymerization reaction was continuously carried out in a 100-l reactor which was muffled with a hot-water jacket, equipped with a stirrer and filled with the reaction solution.

After preparing a mixture of 150 l of n-hexane and 27.5 g of TEA in the 250-l vessel equipped with stirrer, 70.5 g of the prepolymerization catalyst and 27.5 g of TEA were slurried therein and circulated with stirring, then the resulting slurry was continuously fed into the reactor at the speed of 15 l/hr. TEA as co-catalyst was diluted with n-hexane in a 80-l vessel and fed into the reactor at the speed of 0.035 kg/hr in the terms of TEA.

CHEDMS, used as a stereoregular improving agent, was fed into the reactor at the speed of 0.00465 kg/hr in a method similar to that discribed above with regard to the co-catalyst.

Propylene and 1-butene as monomers were continuously fed into a 300-l vessel at the speed of 3.6 kg/hr and 12.9 kg/hr, respectively, and simultaneously n-hexane was fed into the vessel to keep the liquid level fixed. The resulting solution of monomers were compressed with a pump, and cooled to about −5° C., then was fed into the reactor at the speed of 64 kg/hr.

Hydrogen, as molecular-weight controlling agent, was fed into the reactor by means of flowing continuously into the monomer feed line. The temperature of the reactor is maintained at 40° C. by means of regulating the temperature of cooling water for monomer solution and the temperature of the hot-water jacket. The pressure of the reactor was regulated at 15 kg/c²G. (the concentration of the monomer in the reactor was 3.1%).

A small amount of methanol was added to the polymerization solution extracted from the reactor and terminated the polymerization reaction, then the unreacted monomer was removed by depressurizing. Further, after washing copolymer with alkaline water, the monomer was removed by steam in a large amount of water and copolymer was obtained at the speed of 2 kg/hr. Drying was carried out in a vacuum drier with heating equipment. The content of butene-1 of the obtained copolymer measured by $^{13}$C-NMR was 57.9% by weight and the obtained copolymer had intrinsic viscosity of 1.6 dl/g measured in tetraline solvent at 135° C. It was also found that MFR was 5.6 and Mw/Mn was 3.6.

REFERENCE EXAMPLE 2

(a)Preparation of the solid catalyst

The solid catalyst was prepared by the method described in the Example 2 of JP-A-60-228504, the disclosure of which is herein incorporated by reference. The obtained solid catalyst was found to contain 4.9 mmol of titanium atoms and 0.35 mmol of n-butoxy groups in 1 g of the solid catalyst.

(b)Production of crystalline propylene random copolymer (A-1)

The catalyst component prepared in the Reference Example 2(a) was supplied to a three-series polymerization reactor such that the polymerization temperature became 65° C., the polymerization pressure became from 7 to 15 kg/cm²G, and the average residence time became 2.5 hours, and while simultaneously supplying 2.7 mols/hr of diethylaluminum chloride (hereinafter abbreviated as DEAC) and 0.08 mols/hour of ε-caprolacton (Al/ε-caprolacton=100/3 molar ratio), propylene and butene-1 were continuously fed at a H$_2$ concentration in the polymerization reactor of 1.5% by volume to conduct a gas phase polymerization.

The obtained copolymer of propylene-butene-1 was found to contain 76.9% by weight of propylene and 23.1% by weight of butene-1. MFR, CXS and Mw/Mn of the obtained copolymer were found to be 1.6, 12.7 and 4.3, respectively.

REFERENCE EXAMPLE 3

A catalyst component as follows was prepared by using the solid catalyst obtained in the Reference Example 1(d) above.

(a) Catalyst component

In a 250-l reactor equipped with a stirrer was placed 150 l of thoroughly purified hexane. The atmosphere in the system was thoroughly replaced with nitrogen. Thereafter 3.2 moles of TEA, 0.32 moles CHEDM and 51.8 g in terms of Ti atom of the solid catalyst obtained in the Reference Example 1(d) mentioned above were added into the flask. With the temperature in the flask maintained at 25° C., 2.8 kg of propylene was continuously fed into the flask for 2 hours.

(b)Production of crystalline propylene random copolymer (A-2)

The catalyst component prepared in the Reference Example 3(a) was supplied to of a three-series polymerization reactor such that the polymerization temperature became 80° C., the polymerization pressure became from 7 to 15 kg/cm²G, and the average residence time became 6 hours, and while simultaneously supplying 50 mmols/hr of TEA and 5 mmols/hour of CHEDMS (Al/CHEDMS=10/1), propylene, ethylene and butene-1 were continuously fed at a $H_2$ concentration in the polymerization reactor of 0.25% by volume to conduct a gas phase polymerization.

The obtained copolymer of propylene-ethylene-butene-1 was found to contain 88.6% by weight of propylene, 1.2% by weight of ethylene and 10.2% by weight of butene-1. MFR and CXS of the obtained copolymer were found to be 3.9 and 2.4, respectively.

EXAMPLE 1

The crystalline propylene random copolymer (A-1) obtained in the Reference Example 2 was added to 0.15% by weight of calcium stearate, 0.1% by weight of Sumilizer@-BHT, 0.05% by weight of Irganox@ 1010 and 0.09% by weight of 2,5-dimethyl-di-(tert-butylperoxy)-hexane, and then mixed with a Henschel mixer. The resulting mixture was melt-extruded by a 40 mmφ extruder to form pellets. The MFR of the obtained pellets was found to be 7.9 and their Mw/Mn was 3.1. Then, 85% by weight of the obtained pellets and 15% by weight of propylene-α-olefin random co-polymer (B) obtained in the Reference Example 1 were mixed with a Henschel mixer and the resulting mixture was melt-extruded by a 40 mmφ extruder to form pellets having the composition of polypropylene random copolymer shown in Table 1 below. The three-layer two-component film consisting of a base film made of Sumitomo Noblene@ FS2011D and heat-seal layers of surfaces made of the above-mentioned pellets was produced with a tenter-type stretching machine. FS2011D for the base film was melt-extruded at a resin temperature of 257° C. and the above-mentioned pellets for the heat-seal layer was melt-extruded at a resin temperature of 222° C., and then quenched with a cooling roll of 30° C. to solidify into the form of sheet 0.9 mm in thickness. Subsequently, the sheet was preheated. The preheated sheet was longitudinally stretched 5-times at a stretching temperature of 120° C. by making use of the difference of peripheral speeds of the rolls of the longitudinal stretching machine, tranversally stretched 8-times at a stretching temperature of 157° C. and heat treated at 165° C. to obtain a three-layer two-component stretched film composed of a sealant layer 1 μm in thickness and a base film 20 μm in thickness without any inferiority of film forming caused by the adhesion to the rolls when the film forming was conducted for a relatively long time.

The film processability, heat-seal temperature, hot tack strength and transparency (haze) of the obtained film are shown in Table 2 below.

EXAMPLE 2

The crystalline propylene random copolymer (A-1) obtained in the Reference Example 2 was melt-extruded by a 40 mmφ extruder to form pellets by the same procedure as in Example 1. The same procedure as in Example 1 was repeated expect for changing the proportion of the obtained pellets and propylene-α-olefin random copolymer (B), and propylene random copolymer composition was obtained as shown in Table 1. The results of evaluation of this composition are shown in Table 2.

EXAMPLE 3

The crystalline propylene random copolymer (A-2) obtained in the Reference Example 3 was added to 0.15% by weight of calcium stearate, 0.1% by weight of Sumilizer@-BHT, 0.05% by weight of Irganox@ 1010 and 0.03% by weight of 2,5-dimethyl-di-(tert-butylperoxy)-hexane, and then mixed with a Henschel mixer. The resulting mixture was melt-extruded by a 40 mmφ extruder to form pellets. The MFR of the obtained pellets was 4.4 and the ratio of Mw/Mn was 3.0. The same procedure as the Example 1 was repeated except for changing the proportion of the obtained pellets and propylene-α-olefin random copolymer (B), and propylene random copolymer composition was obtained as shown in Table 1. The results of evaluation of this composition are shown in Table 2.

COMPARATIVE EXAMPLE 1

The crystalline random copolymer (A-1) was individually evaluated and the results of evaluation of this composition are shown in Table 2.

COMPARATIVE EXAMPLE 2

The same procedure as in Example 1 was repeated expect for changing the proportion of the crystalline propylene random copolymer (A-1) and propylene-α-olefin random copolymer (B), and a polypropylene composition was obtained as shown in Table 1. The results of evaluation of this composition are shown in Table 2.

COMPARATIVE EXAMPLE 3

The same procedure as the Example 1 was repeated except the crystalline propylene random copolymer (A-1) was replaced by Tafmer@ XR110 T (Produced by Mitsui Petrorium Chemical Co. Ltd.; MFR is 7.5, butene-1 content 30.8% by weight) and propylene random copolymer composition was obtained as shown in Table 1. The results of evaluation of this composition are shown in Table 2.

COMPARATIVE EXAMPLE 4

The same procedure as the Example 1 was repeated except the crystalline propylene random copolymer (A-1) was replaced by a propylene-ethylene copolymer (MFR is 11.3, ethylene content 4.5% by weight) and the polypropylene composition shown in Table 1 was obtained. The results of evaluation of this composition are shown in Table 2.

COMPARATIVE EXAMPLE 5

The same procedure as in Example 3 was repeated excep the propylene-α-olefin random copolymer (B) was replaced by PB-1 (M2481: Produced by Mitsui Petrorium Chemical Co. Ltd., MFR is 8.8, the content of butene-1 is 80.6% by weight), and the propylene random copolymer composition as shown in Table 1 was obtained. The results of evaluation of this composition are shown in Table 2.

TABLE 1

| | Crystalline propylene random copylmer (A) | | | | | Propylene-α-olefine random copolymer (B) | | | | Polypropylene Composition | | | | |
|---|---|---|---|---|---|---|---|---|---|---|---|---|---|---|
| | | content wt % | | | | | content wt % | | | | | content wt % | | |
| | content wt % | propylene | ethylene | butene-1 | CXS % | content wt % | propylene | butene-1 | CXS % | MFR g/10 min | propylene | ethylene | butene-1 | CXS wt % |
| Example-1 | 85 | 76.9 | 0 | 23.1 | 12.7 | 15 | 42.1 | 57.9 | 90.4 | 7.4 | 73.0 | 0 | 27.0 | 25.4 |
| Example-2 | 80 | 76.9 | 0 | 23.1 | 12.7 | 20 | 42.1 | 57.9 | 90.4 | 8.6 | 72.1 | 0 | 27.9 | 27.7 |
| Example-3 | 90 | 88.6 | 1.2 | 10.2 | 2.4 | 10 | 42.1 | 57.9 | 90.4 | 5.0 | 86.0 | 1.1 | 12.9 | 10.3 |
| Comparative Example-1 | 100 | 76.9 | 0 | 23.1 | 12.7 | 0 | — | — | — | 7.2 | 76.9 | 0 | 23.1 | 12.7 |
| Comparative Example-2 | 60 | 76.9 | 0 | 23.1 | 12.7 | 40 | 42.1 | 57.9 | 90.4 | 7.8 | 62.7 | 0 | 37.3 | 40.1 |
| Comparative Example-3 | 85 | 69.2 | 0 | 30.8 | 39.2 | 15 | 42.1 | 57.9 | 90.4 | 7.8 | 65.0 | 0 | 35.0 | 43.4 |
| Comparative Example-4 | 85 | 95.5 | 4.5 | 0 | 3.7 | 15 | 42.1 | 57.9 | 90.4 | 11.7 | 87.4 | 3.8 | 8.8 | 15.5 |
| Comparative Example-5 | 90 | 88.6 | 1.2 | 10.2 | 2.4 | 10 | 19.4 | 80.6 | 99.3 | 7.5 | 85.1 | 1.0 | 13.9 | 11.7 |

TABLE 2

| | Heat Seal Temperature °C. | Hot Tack Strength (g/75 mm) | | | | | | | | | | Trans-parency haze °C. | Film Process-ability |
|---|---|---|---|---|---|---|---|---|---|---|---|---|---|
| | | 55 | 65 | 75 | 85 | 95 | 105 °C. | 115 | 125 | 135 | 145 | 155 | | |
| Example-1 | 78 | | 53> | 111 | 199 | 260< | 260< | 260< | 260< | 260< | 120 | 60 | 1.2 | Δ |
| Example-2 | 79 | | 53> | 102 | 196 | 239 | 260< | 260< | 260< | 260< | 260< | 63 | 1.5 | Δ |
| Example-3 | 91 | | | 53> | 70 | 260< | 260< | 260< | 260< | 260< | 260< | 241 | 1.9 | ○ |
| Comparative Example-1 | 88 | | | 53> | 145 | 260< | 260< | 260< | 248 | 260< | 210 | 104 | 1.1 | ○ |
| Comparative Example-2 | 68 | 53> | 94 | 260< | 260< | 260< | 260< | 260< | 260< | 260< | 250 | 72 | 53> | 1.2 | X |
| Comparative Example-3 | 65 | 53> | 96 | 260< | 260< | 250< | 260< | 260< | 260< | 260< | 85 | 61 | 1.3 | X |
| Comparative Example-4 | 73 | 53> | 58 | 96 | 142 | 154 | 162 | 118 | 53> | 96 | 53> | | 1.3 | ○ |
| Comparative Example-5 | 92 | | | 53> | 58 | 92 | 130 | 134 | 75 | 190 | 138 | 66 | 1.8 | ○ |

With regard to the film, the wider the temperature range within which the hot tack strength is satisfactory, the better the hot tack property of the film. As shown in Table 2, the laminated and oriented film of Example 1 had a hot tack strength of 260 g/75 mm or more within the temperature range of 95° to 135° C., the film of Example 2 had a hot tack strength of 260 g/75 mm or more within the temperature range of 105° to 145° C. and the film of Example 3 had a hot tack strength of 260 g/75 mm or more within the temperature range of 95° to 145° C., and all of the films in Examples 1 to 3 had a hot tack strength of 260 g/75 mm or more at heat sealing temperature range wider than 40° C., which were better results than Comparative Examples.

In accordance with the present invention described above, the polypropylene composition can be used to prepare laminated and oriented films with a good balance between low-temperature heat sealability and hot tack srength, with good processability when formed into a film, and also laminated and oriented film having a surface layer comprising said polypropylene composition can be obtained.

What is claimed is:

1. A laminated and oriented film comprising a substrate and a surface layer of a propylene-α-olefin random copolymer composition comprising:

(A) from 75 to 95% by weight of a crystalline propylene random copolymer obtained by gas-phase polymerization of propylene and an α-olefin having from 4 to 10 carbon atoms, wherein the crystalline random copolymer contains components soluble in xylene at 20° C. in an amount less than 15% by weight, propylene in an amount from 73 to 97% by weight based upon the total weight of the copolymer, and α-olefin in an amount from 3 to 27% by weight, and wherein said crystalline propylene random copolymer does not contain ethylene, and (B) from 5 to 25% by weight of a propylene random copolymer of propylene and an α-olefin having from 4 to 10 carbon atoms, wherein the propylene random copolymer contains propylene in an amount from 40 to 50% by weight and α-olefin in an amount from 50 to 60% by weight, has a molecular weight distribution (Mw/Mn) of less than 4.0, an intrinsic viscosity measured in tetralin at 135° C. of 1 to 2 dl/g, and a melt flow rate measured by the method of condition-14 according to JIS K7210, of 4 to 8 g/10 mins., and is obtained by the copolymerization of proplyene and α-olefin using a solid catalyst component comprising Ti, Mg, a halogen and an electron donor in the presence of solvent, and wherein the propylene-α-olefin random copolymer composition has a melt flow rate measured by the method of condition-14 according to JIS K7210 of 1 to 50 g/10 mins. and contains components soluble in xylene at 20° C. in an amount less than 30% by weight.

2. The film of claim 1, wherein the α-olefin in the crystalline propylene random copolymer (A), the propylene random copolymer (B), or the crystalline propylene random copolymer (A) and the propylene random copolymer (B) is butene-1.

* * * * *